(12) United States Patent
Minagoshi et al.

(10) Patent No.: US 7,195,045 B2
(45) Date of Patent: Mar. 27, 2007

(54) TIRE HAVING TREAD INCLUDING GLASS FIBERS AND PARTICLES HAVING MOH'S HARDNESS OF AT LEAST 5

(75) Inventors: Akira Minagoshi, Kobe (JP); Mamoru Uchida, Kobe (JP); Takeshi Ota, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 68 days.

(21) Appl. No.: 10/256,139

(22) Filed: Sep. 27, 2002

(65) Prior Publication Data

US 2003/0069345 A1    Apr. 10, 2003

(30) Foreign Application Priority Data

Sep. 27, 2001  (JP) ............................. 2001-296925

(51) Int. Cl.
*B60C 1/00* (2006.01)
*B60C 11/00* (2006.01)

(52) U.S. Cl. .................. 152/209.4; 152/211; 152/458; 524/494

(58) Field of Classification Search ............. 152/209.4, 152/211, 212, 458, 208, 210; 524/494
See application file for complete search history.

(56) References Cited

U.S. PATENT DOCUMENTS

| | | | | |
|---|---|---|---|---|
| 4,082,131 | A | * | 4/1978 | Scheller ...................... 152/210 |
| 4,857,244 | A | * | 8/1989 | Berger ......................... 264/438 |
| 5,351,734 | A | * | 10/1994 | Mouri et al. ............. 152/209.4 |
| 5,412,910 | A | * | 5/1995 | Woodson et al. ............. 451/38 |
| 5,591,279 | A | | 1/1997 | Midorikawa et al. |
| 5,702,546 | A | * | 12/1997 | Itoh et al. ................. 152/209.4 |
| 6,058,994 | A | * | 5/2000 | Amino et al. ................ 152/211 |
| 6,623,380 | B2 | * | 9/2003 | Jordan ........................ 473/372 |
| 2002/0026003 | A1 | * | 2/2002 | Tahara et al. ................ 524/494 |
| 2004/0019135 | A1 | * | 1/2004 | Horiguchi et al. ............. 524/47 |

FOREIGN PATENT DOCUMENTS

| | | | |
|---|---|---|---|
| DE | 2326455 | * | 11/1974 |
| DE | 4005493 A | | 8/1990 |
| EP | 1006007 | * | 6/2000 |
| EP | 1-072446 A2 | | 1/2001 |
| EP | 1-172406 A2 | | 1/2002 |
| EP | 1-172406 A3 | | 1/2002 |
| JP | 59-68349 | * | 4/1984 |
| JP | 62-191204 | * | 8/1987 |
| JP | 6-328906 A | | 11/1994 |
| JP | 08-217918 A | | 8/1996 |
| JP | 11-035736 A | | 2/1999 |
| JP | 2000158907 A | | 6/2000 |
| JP | 2000-319451 A | | 11/2000 |
| JP | 2001233993 A | | 8/2002 |
| WO | WO 85/05329 | * | 12/1985 |

OTHER PUBLICATIONS

Mohs Scale of Mineral Hardness, www.amfed.org/t_mohs.htm, Oct. 1999.*
Properties of Copper, www.unr.edu/sb204/geology/props.htm, Sep. 1999.*

* cited by examiner

*Primary Examiner*—Steven D. Maki
(74) *Attorney, Agent, or Firm*—Birch, Stewart, Kolasch & Birch, LLP

(57) ABSTRACT

A rubber composition which can improve performance on icy and snowy road sufficiently and a tire using the same. The rubber composition comprises 2 to 30 parts by weight of staple fibers having an average fiber diameter of 10 to 100 μm and an average fiber length of 0.01 to 4 mm, and 1 to 10 parts by weight of particles having a Moh's hardness of at least 5 and an average particle size of at most 500 μm based on 100 parts by weight of a diene rubber. The tire of the present invention is prepared by using the rubber composition for tread. Examples of the particle are pumice, quarts, emery and the like.

12 Claims, No Drawings

TIRE HAVING TREAD INCLUDING GLASS FIBERS AND PARTICLES HAVING MOH'S HARDNESS OF AT LEAST 5

BACKGROUND OF THE INVENTION

The present invention relates to a rubber composition and a tire, particularly a rubber composition which can improve performances of studless tire on icy and snowy road and a tire whose tread comprises the rubber composition.

Heretofore, when automobiles are driven in cold region with heavy snowfall, studded tires or snow chain-equipped tires are used to ensure the safety on snowy and icy road. However, studded tires or chain-mounted tires easily wear out the road surface, generating dust to cause serious air pollution, which is now regarded as a significant environmental problem.

In order to guarantee safety and solve environmental issues mentioned above, studless tires which has appropriate braking and driving performances on snowy and icy road without any stud or chain has been rapidly developed.

As a studless tire, automobile tires whose performance on ice is improved by compounding sand (JP-A-61-150803) or metallic fibers (JP-A-63-34026) into the tread rubber are proposed. However, in such tires, hardness of the rubber becomes relatively high, and therefore friction on ice is insufficient. In addition, as tire wears off, those sand, metallic fibers and other metals fall off and the particles are spattered to cause a serious environmental problem of dust pollution.

Alternatively, it is also proposed to use foamed rubber for the tread rubber (JP-A-62-283001, JP-A-63-9042 and JP-A-1-118542). However, in these tires, though frictional force on ice is improved, edge effect and water discharging ability due to voids on the tread surface cannot be fully utilized because the foamed rubber has low block stiffness, and abrasion resistance and steering performance on dry road become inferior. Moreover, since foaming is performed in the vulcanization step of the production, dimensional accuracy is likely to be influenced.

In addition, techniques to compound hollow particles in the tread to improve tire performances on icy and snowy road are proposed (JP-A-11-35736 and JP-A-6-328906). However, in these tires, fine hollow particles are broken during kneading, resulting in a problem that sufficient icy and snowy road performances cannot be achieved.

For another technique, it is proposed to compound a water-absorbing synthetic polymer in the tread rubber to remove water existing between the road surface and the tread (JP-A-5-148390). However, the water absorbing ability of such synthetic polymer is insufficient, and it cannot be said that edge effect after the polymer has fallen is sufficient because the falling of the polymer does not take place immediately after the water absorption.

Other than the above, a method of improving grip performance on icy road by compounding staple fibers orientating them in the direction perpendicular to the tread face to increase digging frictional force is proposed (JP-A-2000-168315). According to these techniques, studless tires have acquired improved grip performance on icy road, but the performance is not yet comparable to that of studded tires.

SUMMARY OF THE INVENTION

An object of the present invention is to provide a rubber composition which can improve performances on icy and snowy road and a tire having those improved performances.

That is, the present invention relates to a rubber composition comprising 2 to 30 parts by weight of staple fibers having an average fiber diameter of 10 to 100 μm and an average fiber length of 0.01 to 4 mm, and 1 to 10 parts by weight of particles having a Moh's hardness of at least 5 and an average particle size of at most 500 μm based on 100 parts by weight of a diene rubber.

The present invention also relates to a tire having a tread comprising the above rubber composition.

DETAILED DESCRIPTION

Examples of diene rubber used for the rubber composition of the present invention include natural rubber, isoprene rubber, butadiene rubber and styrene-butadiene rubber. These diene rubbers may be used alone or in combination of two or more.

In the rubber composition of the present invention, grip performance on icy road can be improved by compounding particular staple fibers. In particular, when the staple fibers are orientated perpendicular to the tread face, digging frictional force is further increased and therefore grip performance on icy road can be improved.

Examples of staple fibers include glass fiber, aluminum whisker, polyester fiber, nylon fiber, polyvinyl formal fiber and aromatic polyamide fiber. Among them, inorganic staple fibers having a specific gravity of at least 2.0, such as glass fiber and aluminum whisker are preferable from the viewpoint that they have excellent compatibility with rubber at kneading, achieve moderate shape after kneading and have excellent orientation.

It is preferable that the Moh's hardness of the staple fiber material is 3 to 6. When the Moh's hardness is less than 3, effect on digging friction against the icy road tends to be small. When the Moh's hardness is more than 6, there is a tendency that the surface of the staple fibers is not easily scratched by the particles as mentioned below. More preferably, the lower limit of the Moh's hardness of the staple fiber is 4 and the upper limit of the Moh's hardness of the staple fiber is 5.

The average fiber diameter of the staple fiber after dispersion in the rubber composition is 10 to 100 μm. When the average fiber diameter is less than 10 μm, flexural strength is poor and thus the digging effect remains small. When the average fiber diameter is more than 100 μm, contact area between the rubber and the ice surface is reduced and therefore adhesion effect tends to decrease. In addition, reinforcing property of the rubber is poor, so that abrasion resistance is adversely affected. Preferably, the lower limit of the average fiber diameter of the staple fiber is 15 μm, and the upper limit of the average fiber diameter of the staple fiber is 70 μm.

The average fiber length of the staple fiber after dispersion in the rubber composition is 0.01 to 4 mm. When the average fiber length is less than 0.01 mm, orientation tends to be difficult. When the average fiber length is more than 4 mm, viscosity of the unvulcanized rubber becomes higher and processability is decreased. Preferably, the lower limit of the average fiber length of the staple fiber is 0.3 mm and the upper limit of the average fiber length of the staple fiber is 2 mm.

The amount of staple fiber is 2 to 30 parts by weight based on 100 parts by weight of the diene rubber. When the amount of staple fiber is less than 2 parts by weight, effect on digging friction is small. When the amount of staple fiber is more than 30 parts by weight, abrasion resistance is decreased.

Preferably, the lower limit of the amount of staple fiber is 4 parts by weight and the upper limit of the amount of staple fiber is 20 parts by weight.

The rubber composition of the present invention further contains particles comprising a material having a Moh's hardness of at least 5. In the step of kneading the staple fibers and the particles with the rubber, the surface of staple fibers is finely scratched owing to the friction between the particles and the staple fibers, and these scratches seem to make staple fibers not easily fall out from the base rubber. Therefore, when the Moh's hardness is less than 5, the surface of staple fiber is not easily scratched by the particles and therefore effect on digging friction is small. Preferably, the lower limit of the Moh's hardness of the material of the particle is 6 and the upper limit of the Moh's hardness of the material of the particle is 8. When the Moh's hardness is more than 8, there is a possibility that asphalt road is damaged.

The term "Moh's hardness" here means one of the mechanical characteristics of materials, which is a long-established measuring method widely used in the field of minerals. In this method, the hardness of a mineral is defined lower than that of a mineral used to scratch the former mineral when the former mineral gets scratched, in the following order of 10 minerals. In ascending order from lower hardness, 1 talc, 2 gypsum, 3 calcite, 4 fluorite, 5 apatite, 6 orthoclase, 7 crystal, 8 topaz (yellow sapphire), 9 corundum and 10 diamond are used.

Examples of materials having a Moh's hardness of at least 5 include hemimorphite, asbestos, manganese, apatite, nickel, glass, hornblende, feldspar, pumice, orthoclase, hematite, augite, iron oxide, high speed steel, toll steel, magnesia, iridium, pyrite, ruthenium, agate, chrome dioxide, garnett, steel, flint, quarts, silicon, chrome, beryllia, zirconia, iridosmium, tourmaline, andalusite, beryl, emery, osmium, topaz, tungsten carbide alloy (sintered), zirconium boride, corundum, titanium nitride, tungsten carbide, tantalum carbide, zirconium carbide, chrome, alumina (casted), alumina (a), alumina (fine crystal), silicon carbide (black), silicon carbide (green), aluminum boride, boron carbide and diamond. Among these, inorganic substances such as pumice, quarts and emery are preferable since they can give particles of desired particle size and they are relatively inexpensive. However, whether the material is organic or inorganic is not particularly limited.

The average particle size of the particle is at most 500 µm. When the average particle size is more than 500 µm, reinforcing property for the rubber is poor and abrasion resistance is adversely affected. The lower limit of the average particle size of the particle is preferably 10 µm, more preferably 30 µm, and the upper limit of the average particle size of the particle is preferably 300 µm, more preferably 150 µm. When the average particle size is less than 10 µm, the surface of the staple fiber is not easily scratched, and therefore effect on digging friction tends to be small.

The amount of the particle is 1 to 10 parts by weight based on 100 parts by weight of the diene rubber. When the amount of the particle is less than 1 part by weight, effect on digging friction is small since the surface of the staple fiber is not easily scratched. When the amount of the particle is more than 8 parts by weight, abrasion resistance is decreased.

The rubber composition of the present invention can be obtained by kneading the staple fibers and the particles with the diene rubber for 1 to 5 minutes. When the kneading time is less than 1 minute, dispersion of the staple fibers and the particles to the rubber tends to be insufficient.

In addition to the above components, the rubber composition of the present invention may be incorporated with components or additives generally used for preparing a rubber in a usual amount if necessary. Concrete examples of such components or additives include reinforcing agents (carbon black, silica); processing oils (paraffin processing oil, naphthene processing oil, aromatic processing oil); vulcanizing agents (sulfur, sulfur chloride compound, organic sulfur compound); vulcanization accelerators (guanidine, aldehyde-amine, aldehyde-ammonia, thiazole, sulfen amide, thiourea, thiuram, dithiocarbamate or xandate compound); crosslinking agents (radical initiators such as organic peroxide compound and azo compound, oxime compound, nitroso compound and polyamine compound); antioxidants (amine derivatives such as diphenylamine and p-phenylenediamine, quinoline derivatives, hydroquinoline derivatives, monophenols, diphenols, thiobisphenols, hinderedphenols and phosphorus acid esters); waxes; stearic acids; zinc oxides; softeners; fillers; and plasticizers.

When carbon black is compounded to the rubber composition of the present invention as a reinforcing agent, it is preferable that the carbon black has a nitrogen adsorption specific surface area ($N_2SA$) of 90 to 150 $m^2/g$ and a DBP (dibutyl phthalate) oil absorption amount of 80 to 140 ml/100 g.

The tire of the present invention is prepared by using the above rubber composition for the tread according to a usual process. That is, the rubber composition is extruded and processed without vulcanization in accordance with the shape of the tread, and the composition is then formed into tread on a tire forming machine in a usual manner to obtain an unvulcanized tire. The unvulcanized tire is heated and pressurized in a vulcanizing machine to obtain a tire.

EXAMPLES

The present invention is explained in detail based on Examples below, but not limited thereto. "Part(s)" and "%" in the following examples mean "part(s) by weight" and "% by weight", respectively, unless otherwise specified.

Materials used in Examples and Comparative Examples are listed below. Each of emery, pumice particle A, pumice particle B and gypsum particle were prepared by pulverizing the respective bulks and sieving the pulverized substance to select particles having a specific particle size.

(Materials)
Natural rubber: RSS #3
Butadiene rubber (BR): UBEPOL BR150B available from Ube Industries, Ltd.
Carbon black: SHOBLACK N220 available from Showa Cabot Co. Ltd.
($N_2SA$: 111 $m^2/g$, DBP oil absorption amount: 111 ml/100 g)
Microcrystalline wax: SUN NOC N available from Ohuchi Shinko Kagaku Kogyo Co., Ltd.
Antioxidant 6PPD: NOCRAC 6C available from Ohuchi Shinko Kagaku Kogyo Co., Ltd.
Stearic Acid: Stearic acid available from NOF Corporation
Zinc oxide: Zinc Oxide available from Mitsui Mining and Smelting Co., Ltd.
Paraffin oil: Diana Process oil available from Idemitsu Kosan Co., Ltd.
Glass fiber: glass fiber available from Japan Sheet Glass Co., Ltd. (average fiber diameter: 33 µm, average fiber length: 6 mm, Moh's hardness: 5)

Emery: prepared for this experiment (average particle size: 100 μm, Moh's hardness: 7 to 9)
Pumice particle A: prepared for this experiment (average particle size: 100 μm, Moh's hardness: 6)
Pumice particle B: prepared for this experiment (average particle size: 700 μm, Moh's hardness: 6)
Gypsum particle: prepared for this experiment (average particle size: 100 μm, Moh's hardness: 2)
Sulfur: powdery sulfur available from Tsurumi Chemicals Co., Ltd.
Vulcanization Accelerator: Nocceler CZ available from Ohuchi Shinko Kagaku Kogyo Co., Ltd.

Evaluation methods in Examples and Comparative Examples are summarized below.

1. Average Fiber Length of Glass Fiber in Rubber

The rubber was sintered and the glass fiber was separated from the polymer component. Thereafter, the glass fiber was observed by using a scanning electron microscope (SEM) and the average fiber length was obtained.

2. Performance on Icy and Snowy Road

The prepared tire was mounted on a Japanese front engine/rear wheel drive automobile with an engine size of 2000 cc, and brake stopping distance was measured by stopping the automobile which was run at a speed of 30 km/h on an ice board. Evaluation was made referring to the index obtained by the following equation on the basis of the tire of Comparative Example 1. The larger the index is, the more excellent the performance on icy and snowy road is.

(Brake stopping distance of Comparative Example 1)÷(Brake stopping distance of each Example)×100

3. Abrasion Resistance

The prepared tire was mounted on a Japanese front engine/rear wheel drive automobile with an engine size of 2000 cc and run for 4,000 km to measure the groove depth of the tire tread. The driven miles at which the groove depth is decreased by 1 mm was obtained and the value was represented as an index to the value of Comparative Example 1. The larger the index is, the better the abrasion resistance is.

(Number of driven miles at which the groove depth of each tire prepared is decreased by 1 mm)÷(Number of driven miles at which the groove depth of tire of Comparative Example 1 is decreased by 1 mm)×100

4. Steering Performance on Dry Road

In a dry asphalt 500-m round slalom course, running time per round was clocked and the time was represented as an index to the time of Comparative Example 1. The larger the index, the better the steering performance on dry road is.

(Running time per round of Comparative Example 1)÷(Running time per round of each Example)×100

Examples 1 and 2 and Comparative Examples 1 to 5

According to the compounds listed in Table 1, components other than sulfur and vulcanization accelerator were kneaded first. Thereafter, sulfur and vulcanization accelerator were added and further kneading was carried out. The obtained rubber composition was used for tread and a tire was prepared by a usual method. The prepared tire was subjected to the above evaluation tests. The results are shown in Table 1.

TABLE 1

|  | Ex. | | Com. Ex | | | | |
|---|---|---|---|---|---|---|---|
|  | 1 | 2 | 1 | 2 | 3 | 4 | 5 |
| Compound (part by weight) | | | | | | | |
| Natural rubber | 70 | 70 | 70 | 70 | 70 | 70 | 70 |
| BR | 30 | 30 | 30 | 30 | 30 | 30 | 30 |
| Carbon black | 45 | 45 | 45 | 45 | 45 | 45 | 45 |
| Microcrystalline wax | 2 | 2 | 2 | 2 | 2 | 2 | 2 |
| Antioxidant | 2 | 2 | 2 | 2 | 2 | 2 | 2 |
| Stearic acid | 3 | 3 | 3 | 3 | 3 | 3 | 3 |
| Zinc oxide | 5 | 5 | 5 | 5 | 5 | 5 | 5 |
| Paraffin oil | 15 | 15 | 15 | 15 | 15 | 15 | 15 |
| Glass fiber | 10 | 10 | 10 | 10 | 10 | 10 | 10 |
| Emery | 5 | — | — | — | — | — | — |
| Pumice particle A | — | 5 | — | — | — | 0.5 | 15 |
| Pumice particle B | — | — | — | — | 5 | — | — |
| Gypsum particle | — | — | — | 5 | — | — | — |
| Sulfur | 1 | 1 | 1 | 1 | 1 | 1 | 1 |
| Vulcanization accelerator | 1.5 | 1.5 | 1.5 | 1.5 | 1.5 | 1.5 | 1.5 |
| Average fiber diameter of glass fiber in rubber (μm) | 33 | 33 | 33 | 33 | 33 | 33 | 33 |
| Average fiber length of glass fiber in rubber (mm) | 0.25 | 0.30 | 0.30 | 0.30 | 0.20 | 0.30 | 0.25 |
| Properties | | | | | | | |
| Performance on icy or snowy road | 115 | 114 | 100 | 103 | 106 | 101 | 108 |
| Driving performance on dry road | 102 | 102 | 100 | 101 | 101 | 102 | 105 |
| Abrasion resistance | 95 | 95 | 100 | 93 | 88 | 98 | 86 |

In Examples 1 and 2 where glass fibers and particles having a specific Moh's hardness and particle size were compounded, performance on icy and snowy road was improved with maintaining abrasion resistance and steering performance on dry road.

On the other hand, in Comparative Example 2 where particles having a low Moh's hardness were used, effect of improving performance on icy and snowy road was small. It seems that this is because the scratching of glass fibers by particles during kneading was not enough, thus the glass fibers has fallen out from the rubber owing to running, and therefore effect on digging friction was not achieved sufficiently.

In Comparative Example 3 where particles having a large particle size was used, performance on icy and snowy road was slightly improved but abrasion resistance was remarkably decreased.

In Comparative Example 4 where only a small amount of particles was compounded, effect of compounding the particles was hardly seen.

In Comparative Example 5 where a large amount of particles was compounded, performance on icy and snowy road was improved but abrasion resistance was remarkably decreased.

According to the present invention, sufficient performance on icy and snowy road can be achieved without decreasing abrasion resistance or steering stability on dry road by using a rubber composition containing staple fibers and particular particles for tire tread.

What is claimed is:

1. A tire having a tread comprising
a diene rubber, 2 to 30 parts by weight of glass fibers having an average fiber diameter of 10 to 100 μm and an average fiber length of 0.01 to 4 mm, and 1 parts by weight of particles having a Moh's hardness of at least 5 and higher than that of the glass fibers, and an average particle size of at most 500 μm based on 100 parts by weight of the diene rubber, wherein the surfaces of the glass fibers are scratched by the particles due to the hardness difference between said glass fibers and said particles.

2. A tire having a tread comprising the rubber composition of claim 1, wherein the glass fibers have a specific gravity of at least 2.0.

3. The tire of claim 1, wherein the average fiber diameter is 15 to 70 μm.

4. The tire of claim 1, wherein the glass fibers have an average fiber length of 0.3 to 2mm.

5. The tire of claim 1, wherein the glass fibers are present in an amount of 4 to 20 parts by weight.

6. The tire of claim 1, wherein the particles have a Moh's hardness of at least 6.

7. The tire of claim 1, wherein the particles have a Moh's hardness of at least 5 and at most 8.

8. The tire of claim 1, wherein the particles have a Moh's hardness which is at least 6 and at most 8.

9. The tire of claim 1, wherein the average particle size is at least 10 μm and at most 500 μm.

10. The tire of claim 9, wherein the average particle size is at least 10 μm and at most 300 μm.

11. The tire of claim 9, wherein the average particle size is at least 30 μm and at most 150 μm.

12. The tire of claim 1, wherein the particles are present in an amount of 1 to 8 parts by weight.

* * * * *